UNITED STATES PATENT OFFICE.

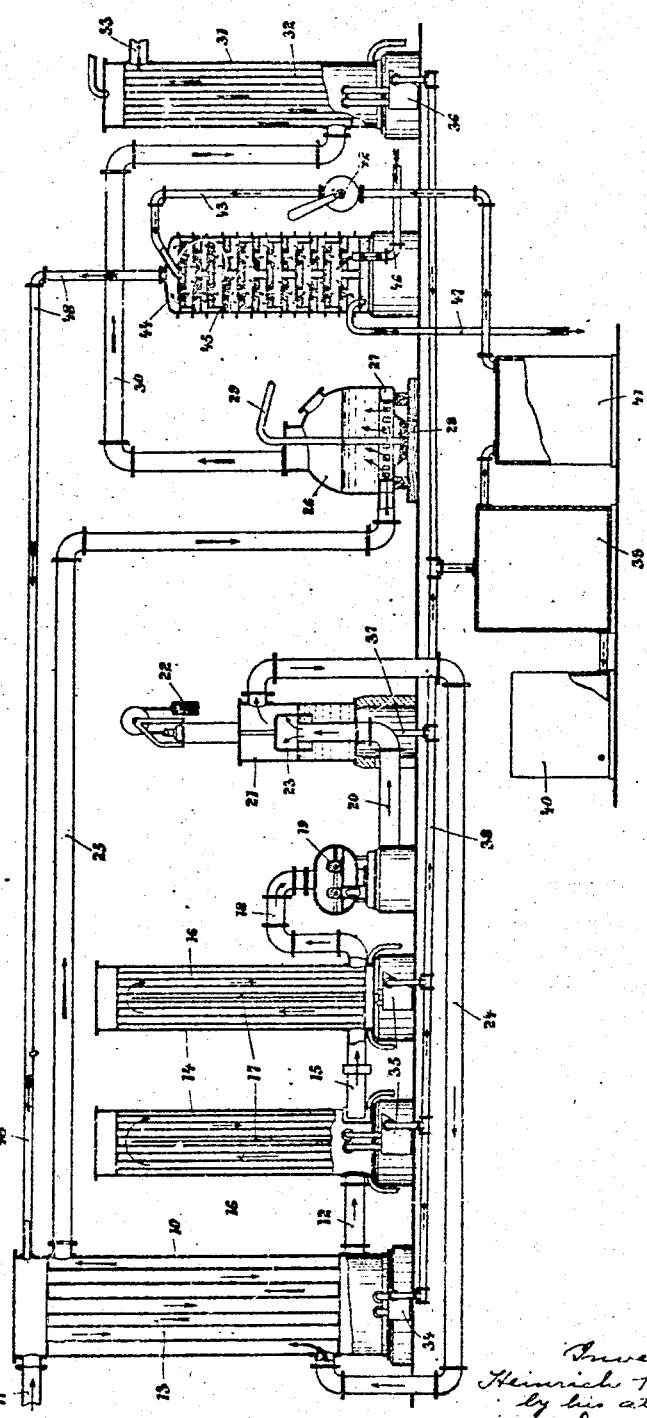

HEINRICH KOPPERS, OF ESSEN-ON-THE-RUHR, GERMANY.

PROCESS OF OBTAINING AMMONIA FROM GAS.

945,332.

Specification of Letters Patent. Patented Jan. 4, 1910.

Application filed May 20, 1909. Serial No. 497,172.

*To all whom it may concern:*

Be it known that I, HEINRICH KOPPERS, a citizen of the German Empire, and resident of 30 Isenbergstrasse, Essen-on-the-Ruhr, Germany, have invented a new and useful Process of Producing Ammonium Sulfate from Gases, of which the following is a specification.

This invention is an improvement in the process wherein superheated gases are passed through a bath of sulfuric acid or acid lye for the purpose of producing ammonium sulfate, as set forth in my Reissue Patent No. 12,971, (original Patent No. 862,976.) In the process set forth in the patent cited the vapors generated by the precipitated ammoniacal liquor are added to the gases before the same enter the saturation bath. According to the present invention these vapors are added to the crude gas, prior to the cooling of the gas and the separation of tar. By this means all the ammonia is restored to the gas, without loss, and the subsequent treatment of the mixture in the cooling apparatus and tar separator precipitates the water which was driven off with the ammonia and separates the tarry constituents derived from the liquor. Pure gas is by this means obtained, in which the proportion of water does not exceed the proportion which saturates the gas at the lowest temperature attained during the cooling process.

The accompanying drawing is a vertical section of apparatus suitable for the purposes of the improved process.

In the drawing, 10 represents a heat-exchanging apparatus to which the crude gases from the ovens flow through the pipe 11, and from which the said gas flows through the pipe 12. The upper and lower parts of the heat exchanging apparatus are connected by the pipes 13. The coolers 14 consist of two columns connected in series by pipes 15. The cooling fluid flows downward in these columns through pipes 16, and the gases are compelled by partition walls 17 to ascend in one half of each cooler and descend in the other half. The coolers 14 are connected by the pipe 18 to the blower 19, which delivers the gases through the pipe 20 to the tar separator 21, in which the gases flow through a perforated belljar 23, balanced by means of a weight 22. From the tar-separator the gases flow through a pipe 24 back to the heat exchanging apparatus. In the latter the cooled gases are reheated by contact with the pipes 13 through which the hot, crude gases flow, and the reheated gases flow through the pipe 25 to the saturation vessel 26 and issue from the perforated distributing ring 27 into the bath of sulfuric acid or acid lye. In this bath the gases give off ammonia, and the salt produced accumulates in the form of salt in the well 28, from which it is then removed through pipe 29. The gases freed from ammonia flow through the pipe 30 to the final cooler 31, and impinge on pipes 32 through which cooling fluid flows. From the cooler 31 the gases flow through pipe 33 for further use.

The products of condensation separated from the gases in the heat-exchanging apparatus 10, coolers 14, tar-separator 21, and cooler 31 pass through the overflow vessels 34, 35, 36 and pipe 37 into the conduit 38 leading to the receptacle 39. In the latter the said products are separated by gravity, the tar flowing into the receptacle 40 and the ammoniacal liquor into the receptacle 41. The liquor is pumped by means of the pump 42 through the pipe 43 into the column still 44 in which it descends, traversing a tier of floors 45 provided with bosses. Steam from the pipe 46 flows in the opposite direction. The residual liquid flows through the pipe 47; the vapors flow through the pipe 48 to the upper part of the heat-exchanging apparatus 10.

The function of the apparatus described is as follows. The gases cooled in the apparatus 10 and coolers 14 are delivered the blower 19 to the tar-separator 21 and ence flow back to the apparatus 10, in which they are re-heated to a temperature above that at which they are saturated by the amount of water contained in them. By reason of this super-heated condition of the gases, ammonium sulfate is separated in a solid state in the saturation vessel 26, in the absence of dissolving action by condensing water. The gases thus treated may be used for various purposes, or may be further treated, for example by washing out the benzol and sulfur purification.

The mixing of the ammonia-laden vapors from the tower 44 with the crude gases has the following effect. The steam mixed with the ammonia is condensed, and absorbs part of the ammonia. This continues until a condition obtains when the liquor flowing to the tower is entirely saturated with ammonia, and the liberated ammonia remains in the gas. The loading of the gas with steam, injurious to the action in the saturation vessel 26, is thus prevented, and on the other hand the enriching of the gas with ammonia reduces the proportion of inactive gas which must pass through the acid. It also follows that the super-heated condition of the gases is attained at a much lower temperature, so that the chemical action in the saturation bath can take place, for example, at a temperature of approximately 40° C., and for the production of neutral ammonia salt this reduction of temperature is of the greatest importance.

With regard to the production of tar the improved process described is also of considerable advantage. As is well known, the ammoniacal liquor containing the "fixed" portion of the ammonia dissolves a large amount of tarry constituents out of the tar separated with the water. When the liquor is distilled the greater portion of this tarry matter goes with the ammonia, and is then separated in the acid bath, soiling the latter and the salt, and being attacked by the acid. In the improved process these tarry constituents are continuously re-separated with the bulk of the tar in the tar-separator.

Another advantage of the improved process is the avoidance of discoloration of the salt by ferro-cyanid compounds arising from the action of the gas on iron pipes in the presence of water. Whereas formerly these compounds entered the bath, they are separated with the other constituents in the improved process before the production of the salt.

The temperature in the tar separator being already comparatively low, the vapors from the ammonia tower may in some cases be led directly to the tar-separator, in which they are subjected to a sufficient reduction of temperature. The essential feature is that these vapors are cooled freed from tar, and mixed with the crude gases.

What I claim is:—

1. Process of obtaining ammonia and tar from the gases of the dry distillation or gasification of fuels, which consists in cooling said gases so as to condense tar and gas water, passing the gases through a tar separator, withdrawing the tar, superheating the gases freed from tar, conducting said gases to an acid saturation bath, passing the gas water through a column still to form a mixture of ammonia and steam, cooling said mixture, separating the tar and water therefrom, and adding the residual ammonia to the gas.

2. Process of obtaining ammonia and tar from the gases of the dry distillation or gasification of fuels, which consists in cooling said gases so as to condense tar and gas water, passing the gases through a tar separator, withdrawing the tar, superheating the gases freed from tar, conducting said gases to an acid saturation bath, passing the gas water through a column still to form a mixture of ammonia and steam, adding said mixture to the raw gas, cooling the resultant mixture, and separating the tar and water.

Signed by me at Joliet, Illinois, this 11th day of May 1909.

HEINRICH KOPPERS.

Witnesses:
LOUIS WILPERTH,
R. GUNDERSON.